(12) United States Patent
Chi (10) Patent No.: US 11,000,018 B2
(45) Date of Patent: May 11, 2021

(54) BIRD FEEDER HAVING A LEVER-LIKE COVER

(71) Applicant: Tzu Ying Chi, Hui Zhou (CN)

(72) Inventor: Tzu Ying Chi, Hui Zhou (CN)

( * ) Notice: Subject to any disclaimer, the term of this patent is extended or adjusted under 35 U.S.C. 154(b) by 318 days.

(21) Appl. No.: 16/025,934

(22) Filed: Jul. 2, 2018

(65) Prior Publication Data

US 2020/0000067 A1    Jan. 2, 2020

(51) Int. Cl.
*A01K 39/01* (2006.01)
*A01K 39/012* (2006.01)

(52) U.S. Cl.
CPC ........ *A01K 39/0113* (2013.01); *A01K 39/012* (2013.01)

(58) Field of Classification Search
USPC ...... D03/121, 124, 126, 127, 128; 119/57.8, 119/57.9, 52.2, 52.3
See application file for complete search history.

(56) References Cited

U.S. PATENT DOCUMENTS

| | | | | |
|---|---|---|---|---|
| 2,344,367 A | * | 3/1944 | Paulpueschel ..... | A01K 39/0113 119/52.3 |
| 2,891,508 A | * | 6/1959 | Bower ............... | A01K 39/0113 119/52.3 |
| 3,117,554 A | * | 1/1964 | Taylor ................ | A01K 39/0113 119/52.3 |
| 4,207,839 A | * | 6/1980 | Barry ................ | A01K 39/0113 119/57.9 |
| 4,821,681 A | * | 4/1989 | Tucker ............... | A01K 39/0113 119/51.01 |
| D351,691 S | * | 10/1994 | Lipton ........................ | D30/127 |
| 5,829,383 A | * | 11/1998 | Blanding ........... | A01K 39/0113 119/52.3 |
| D409,339 S | * | 5/1999 | Silano .......................... | D13/118 |
| 9,192,147 B2 | * | 11/2015 | Hoysak .............. | A01K 39/0113 |
| 2003/0033985 A1 | * | 2/2003 | Hardison .............. | A01K 39/00 119/57.9 |
| 2010/0192864 A1 | * | 8/2010 | Colwell ............... | A01K 39/012 119/57.8 |
| 2015/0342154 A1 | * | 12/2015 | DiOrio ..................... | C11D 3/30 119/52.2 |

* cited by examiner

*Primary Examiner* — Andrea M Valenti
(74) *Attorney, Agent, or Firm* — Chun-Ming Shih; HDLS IPR Services (57) ABSTRACT

A bird feeder is provided with a feed container including an internal space and at least one feeding opening on an outer surface and communicating with the internal space; at least one perch disposed on the outer surface of the feed container and each extending outwardly under the feeding opening; a support assembly disposed on the outer surface of the feed container and above the feeding opening; and a cover including a central opening disposed on the feed container. A bottom edge of the central opening is rested upon the support assembly. The cover acts as a lever in response to a force exerted thereon.

10 Claims, 9 Drawing Sheets

BIRD FEEDER HAVING A LEVER-LIKE COVER

BACKGROUND OF THE INVENTION

1. Technical Field

The technical field relates to bird feeders, and more particularly relates to a bird feeder having a cover adapted to incline in response to a weight of, for example, a large animal landing thereon so as to prevent the animal from stably standing on the cover to access feed.

2. Description of Related Art

Conventionally, bird feeders are placed outdoors. A bird feeder comprises a cylindrical container filled with bird food (i.e., feed), a plurality of feeding openings on the container, and a plurality of perches each disposed under the feeding opening. A bird may stand on the perch for accessing the feed through the feeding opening.

It is understood that large animals such as squirrels may also access the feed because the bird feeder is placed outdoors. Typically, the squirrel may land on a cover, jump down to a perch, and access the feed. The squirrels have the habit of storing feed. Thus, the feed in the container may be consumed quickly by one or more squirrels. As a result, the purpose of feeding birds is compromised.

Thus, the need for improvement still exists.

SUMMARY OF THE INVENTION

The disclosure is directed to a bird feeder for eliminating drawbacks including those associated with the conventional art.

It is therefore one object of the invention to provide a bird feeder comprising a feed container including an internal space and at least one feeding opening on an outer surface and communicating with the internal space; at least one perch disposed on the outer surface of the feed container and each extending outwardly under the feeding opening; a support assembly disposed on the outer surface of the feed container and above the feeding opening; and a cover including a central opening disposed on the feed container; wherein a bottom edge of the central opening is rested upon the support assembly so that the cover is configured to incline in response to a force exerted thereon.

One of the exemplary embodiments, the feeding station includes a hollow, truncated cone, a joining member having an upper portion provided with the hollow, truncated cone, and a perch provided with a lower portion of the joining member and directly under the feeding opening; and wherein the hollow, truncated cone has a tapered end inserted into the feeding opening with the joining member engaged with the feeding opening.

One of the exemplary embodiments, the support assembly comprises a sleeve and an internally threaded nut; wherein the sleeve includes a truncated conic member tapered upward, an annular latch extending upward from a top of the truncated conic member, a plurality of vertical grooves formed with the latch, external threads formed on an outer surface of the latch, and an outwardly extending rim provided on a bottom edge of the truncated conic member; and wherein the sleeve is disposed on the shroud, and the internally threaded nut is secured to the external threads of the sleeve so that the sleeve and the shroud are fastened together.

One of the exemplary embodiments, the cover includes a central opening having a diameter greater than that of a lower portion of the truncated conic member but less than that of the outwardly extending rim.

It is another object of the invention to provide a bird feeder comprising a feed container including an internal space and at least one feeding opening on an outer surface and communicating with the internal space; at least one perch disposed on the outer surface of the feed container and each extending outwardly under the feeding opening; a ball-shaped support including a hole extending from one side to the other side through a center; a cover including a central hole; and a hanging member passing through the hole of the ball-shaped support to secure to the feed container; wherein a bottom edge of the central hole is rested upon the ball-shaped support so that the cover is configured to incline in response to a force exerted thereon.

One of the exemplary embodiments, the feeding station includes a hollow, truncated cone, a joining member having an upper portion provided with the hollow, truncated cone, and a perch provided with a lower portion of the joining member and directly under the feeding opening; and wherein the hollow, truncated cone has a tapered end inserted into the feeding opening with the joining member engaged with the feeding opening.

One of the exemplary embodiments, the central opening of the cover has a diameter less than that of the ball-shaped support.

The invention has the following advantages and benefits in comparison with the conventional art:

For accessing the feed in the internal space, a squirrel may descend toward and settle onto the cover. However, the squirrel may have difficulties in stably standing on the dome-shaped cover. Further, the weight of the squirrel may tip the balance of the cover. As such, the portion of the cover opposite to the position of the squirrel may move upward similar to lever. As a result, the squirrel slides down from the cover. This arrangement can prevent the squirrel or the like from stably standing on the cover to access the feed.

The above and other objects, features and advantages of the invention will become apparent from the following detailed description taken with the accompanying drawings.

DETAILED DESCRIPTION OF THE INVENTION

Embodiments of the invention will now be described, by way of example only, with reference to the accompanying drawings.

Referring to FIGS. 1 to 6, a bird feeder 100 in accordance with a first preferred embodiment of the invention comprises a feed container 10, a plurality of feeding stations 20, a support assembly 30, a cover 40 and a hanging member 50 as described in detail below.

As shown in FIGS. 1 to 4 specifically, the feed container 10 comprises a cylindrical shroud 11, a base 12 and a cap 13. The shroud 11 is cylindrical and includes an internal space 111 having a top opening 112 for allowing feed to fill into the space 111, a plurality of feeding openings 113 provided on a surface of the shroud 11, a plurality of apertures 115 each under the feeding opening 113, and two opposite holes 114 adjacent to an open bottom. The base 12 includes an inverted dome 121, an upward extending annular flange 122 on a central portion of a top, and two opposite tabs 123 inserted into the holes 114 to fasten the shroud 11 and the base 12 together and close the bottom of the shroud 11. The inverted dome 121 has a diameter greater than that of the shroud 11 and extends outwardly from an annular bottom edge of the bottom of the shroud 11. The cap 13 is releasably secured to the top opening 112 of the shroud 11 and includes a hole 131 through a center.

The feeding stations 20 are provided on a lower portion of the shroud 11 and each is disposed under the corresponding feeding opening 113. The feeding station 20 includes a hollow, truncated cone 21, a joining member 22 having an upper portion provided with the truncated cone 21, a pin 116 provided with a lower portion of the joining member 22 and directly under the truncated cone 21, and a rod-shaped perch 23 provided with the lower portion of the joining member 22 and opposite to the pin 116. The truncated cone 21 has its tapered end inserted into the feeding opening 113 until the joining member 22 is stopped by the feeding opening 13. The pin 116 is inserted into the aperture 115 such that the feeding station 20 is secured to the shroud 11. The perch 23 is exposed so that a bird may stand thereon.

Figure 1:
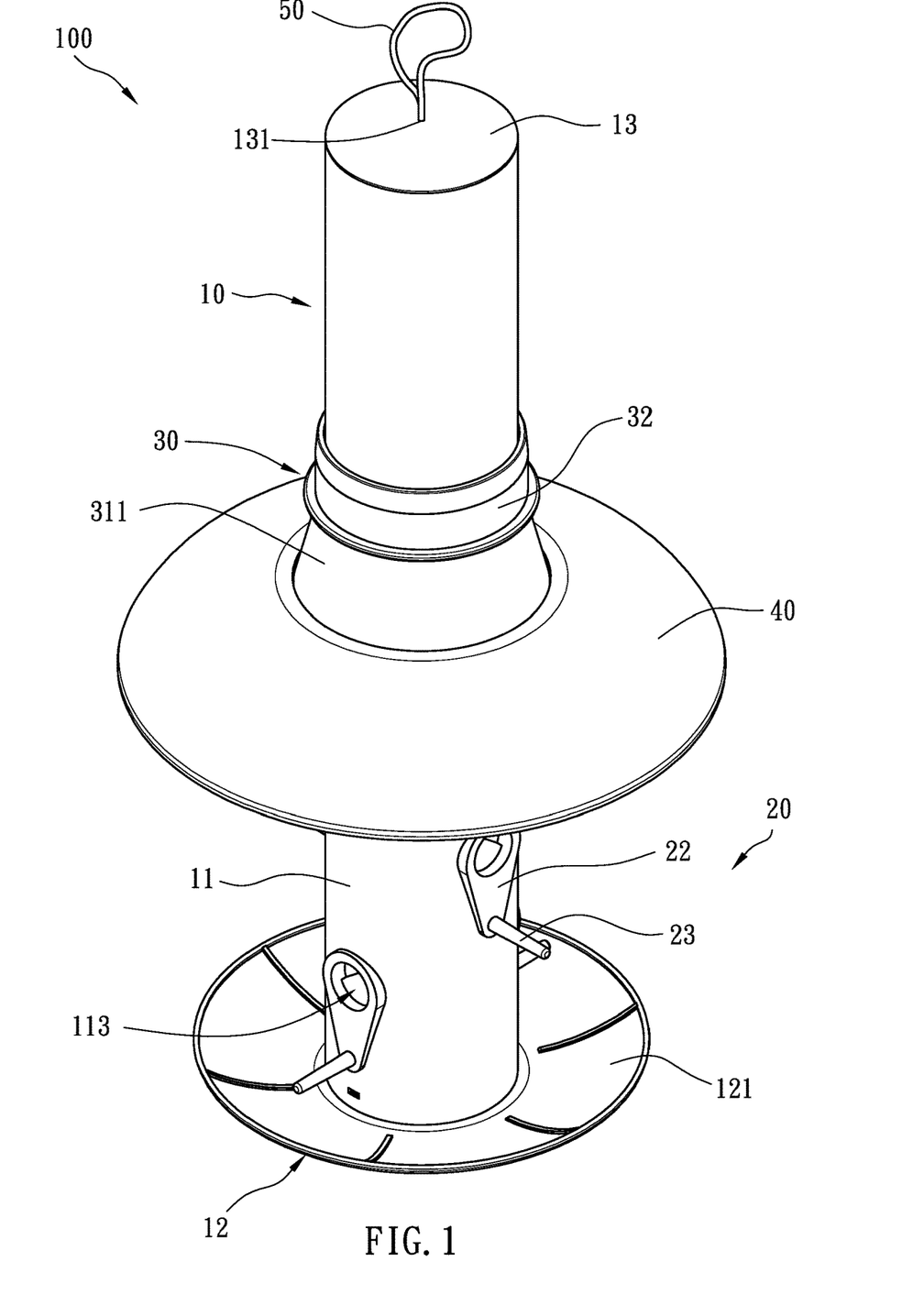
FIG. 1 is a perspective view of a bird feeder according to a first preferred embodiment of the invention.
Figure 2:
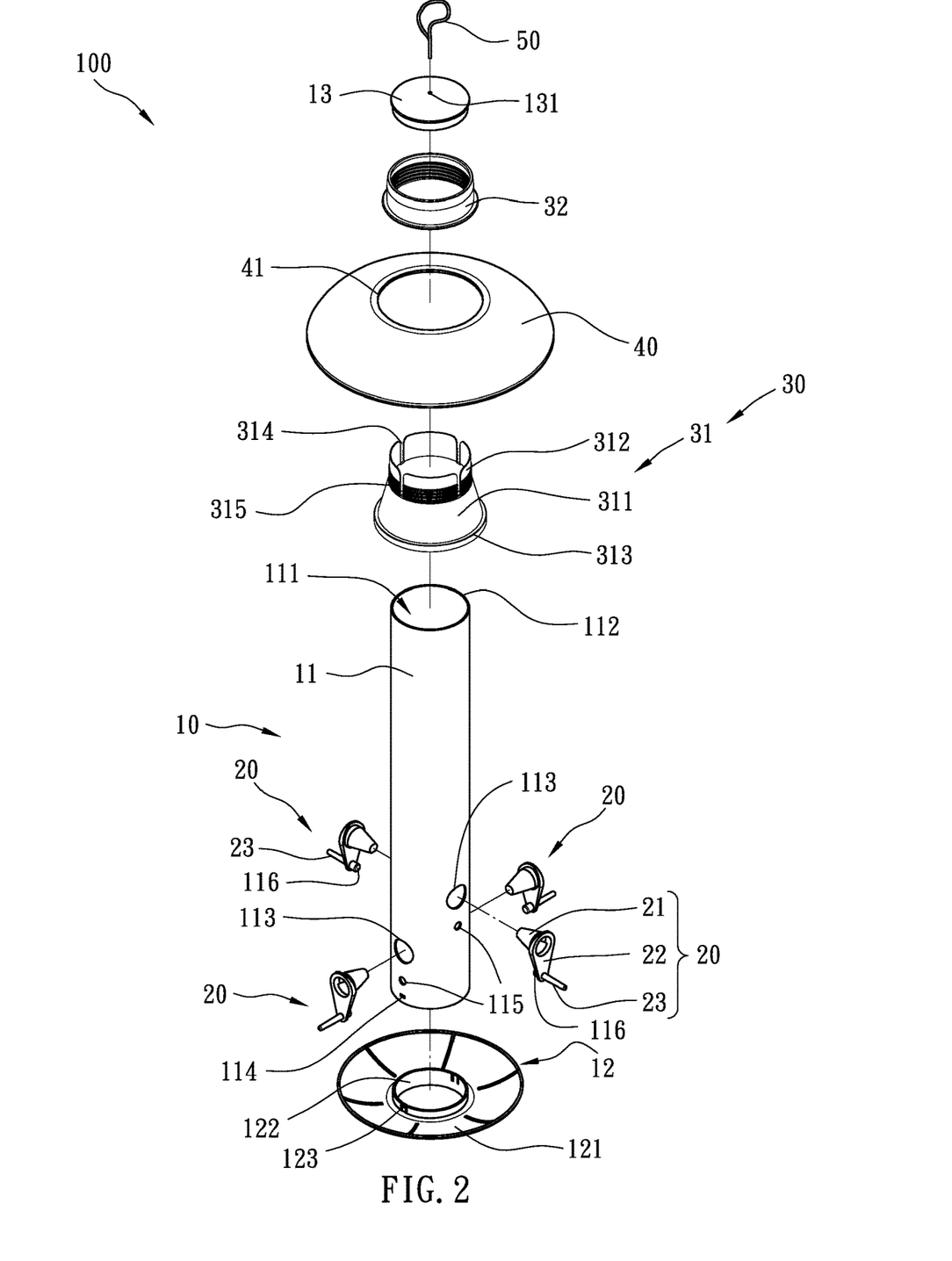
FIG. 2 is an exploded perspective view of the bird feeder.
Figure 3:
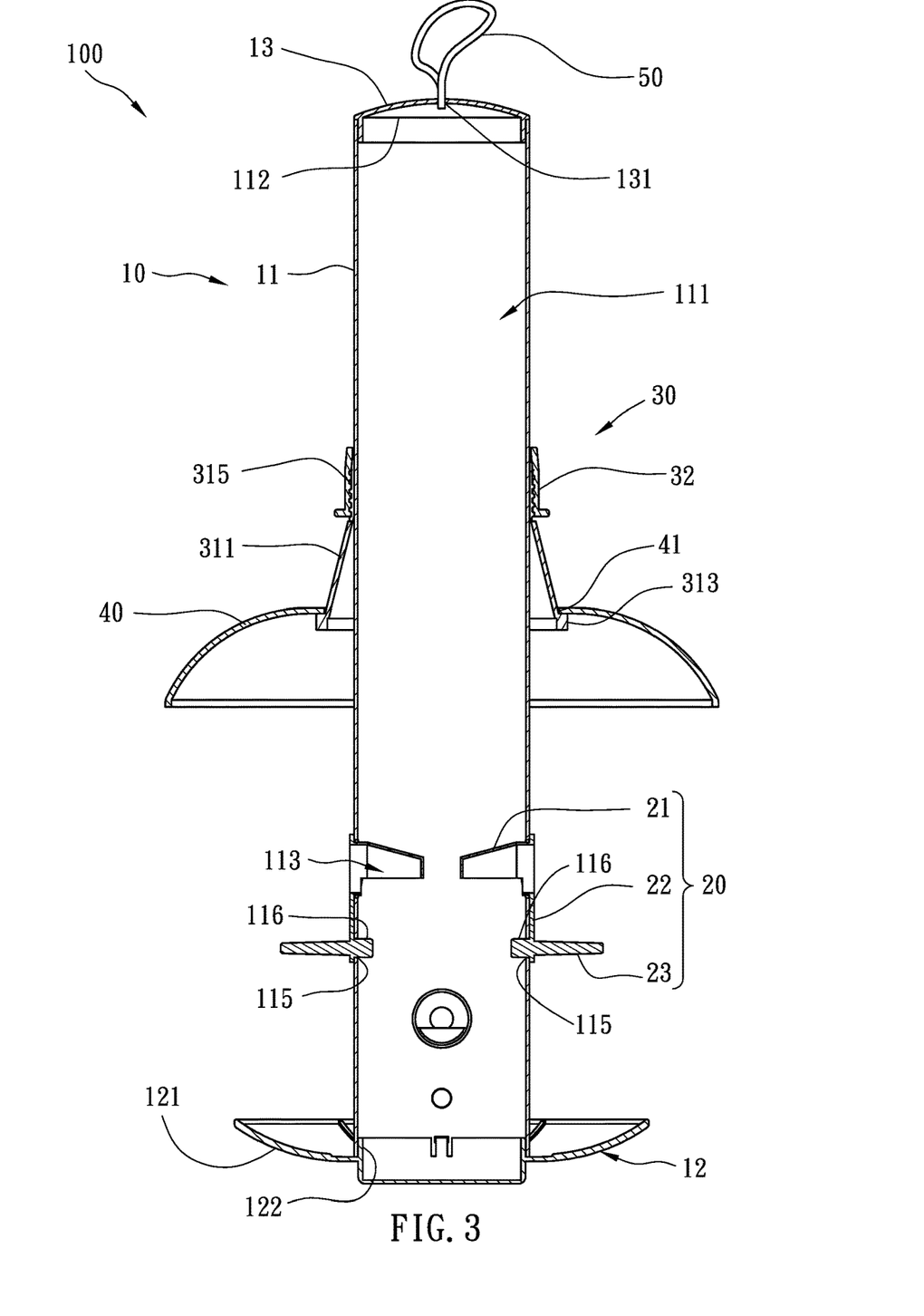
FIG. 3 is a longitudinal sectional view of the bird feeder.
Figure 4:
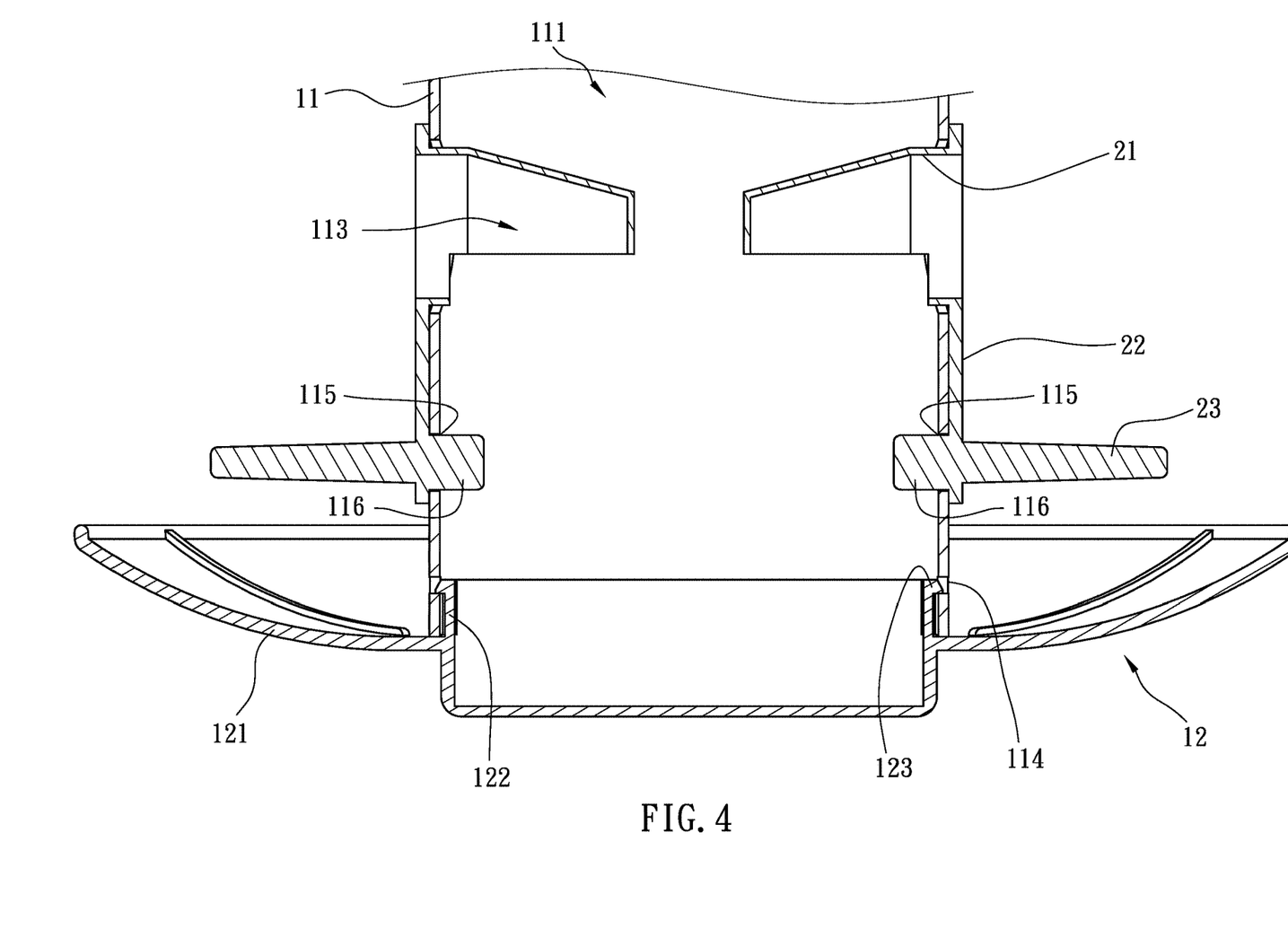
FIG. 4 is an enlarged view of the lower portion of FIG. 3.

The support assembly 30 is releasably provided on the shroud 11 and disposed above the feeding openings 113. The support assembly 30 comprises a sleeve 31 and an internally threaded nut 32. The sleeve 31 includes a truncated conic member 311 tapered upward, an annular latch 312 extending upward from a top of the conic member 311, a plurality of vertical, equally spaced grooves 314 formed with the latch 312, external threads 315 provided on an outer surface of a lower portion of the latch 312, and an outwardly extending rim 313 provided on an annular bottom edge of the conic member 311.

The sleeve 31 is put on the shroud 11. The nut 32 has internal threads (see FIGS. 2 and 3). The nut 32 has a slightly tapered top. The nut 32 is secured to the external threads 315 of the sleeve 31 so that the sleeve 31 and the shroud 11 can be fastened together. Finally, the support assembly 30 is disposed above the feeding openings 113.

The cover 40 is dome shaped and includes a central opening 41 having a diameter greater than that of a lower portion of the conic member 311 but less than that of the rim 313. The opening 41 of the cover 40 is put on the shroud 11 of the feed container 10. A bottom edge of the opening 41 is rested upon the rim 313 of the support assembly 30. The cover 40 may incline in response to a force exerted thereon. Also, the conic member 311 does not interfere with the cover 40. Thus, the cover 40 returns to its original position after the force has disappeared (see FIG. 3).

The hanging member 50 is attached to the cap 13 of the feed container 10 so that the hanging member 50 may be hung from something. In the embodiment, the hanging member 50 is a rope having one end tied as a knot fastened in the hole 131 of the cap 13 and the other end tied as a loop which is adapted to put on something. In another embodiment, the hanging member 50 is a hook.

The components and assembly of the bird feeder 100 according to the first preferred embodiment of the invention have been described. The cover 40 of the bird feeder 100 may incline in response to a force exerted thereon. Applications of the bird feeder 100 are described in detail below.

Figure 5:
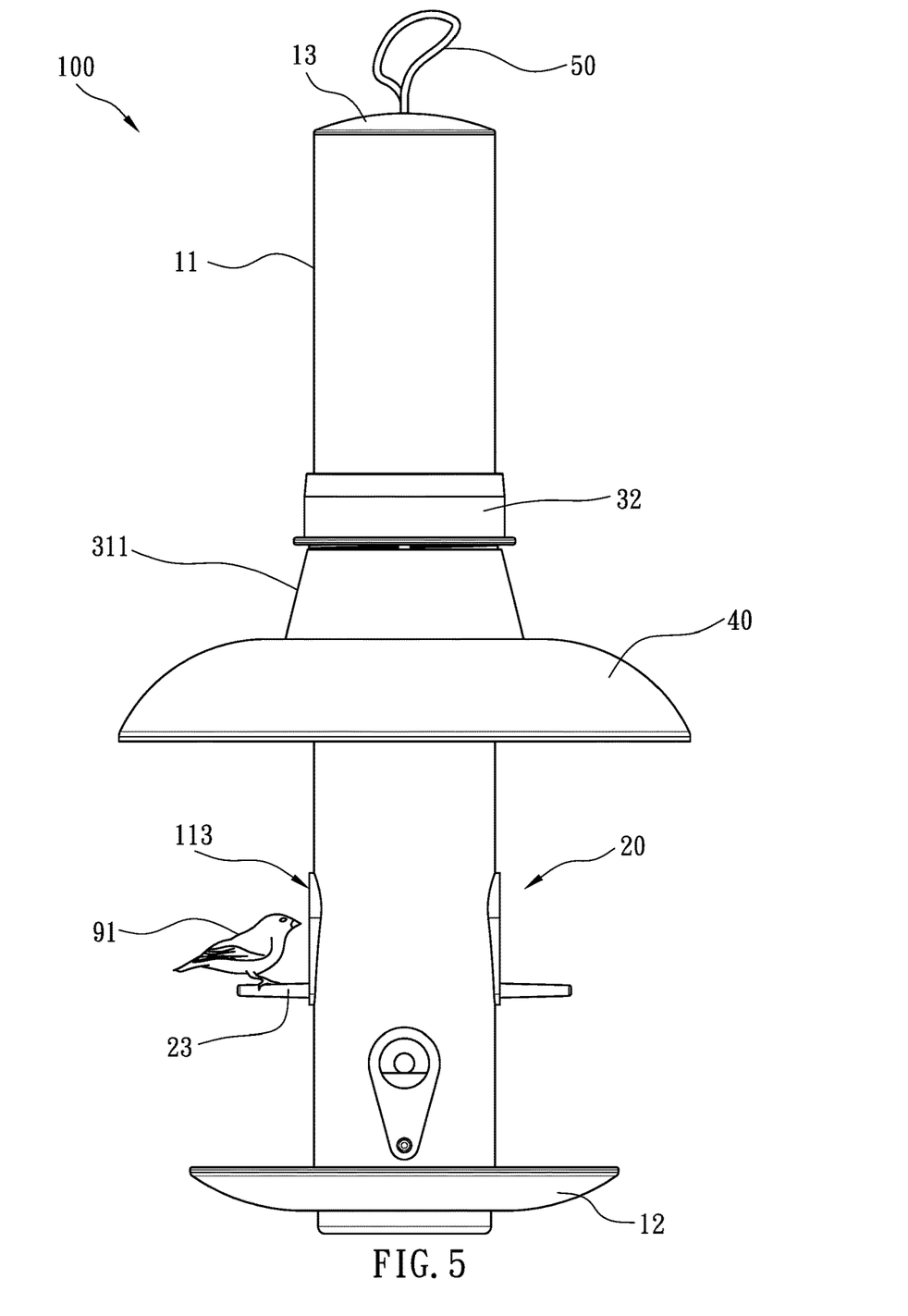
FIG. 5 is a side elevation of FIG. 1 showing a bird standing on a perch of the bird feeder.
Figure 6:
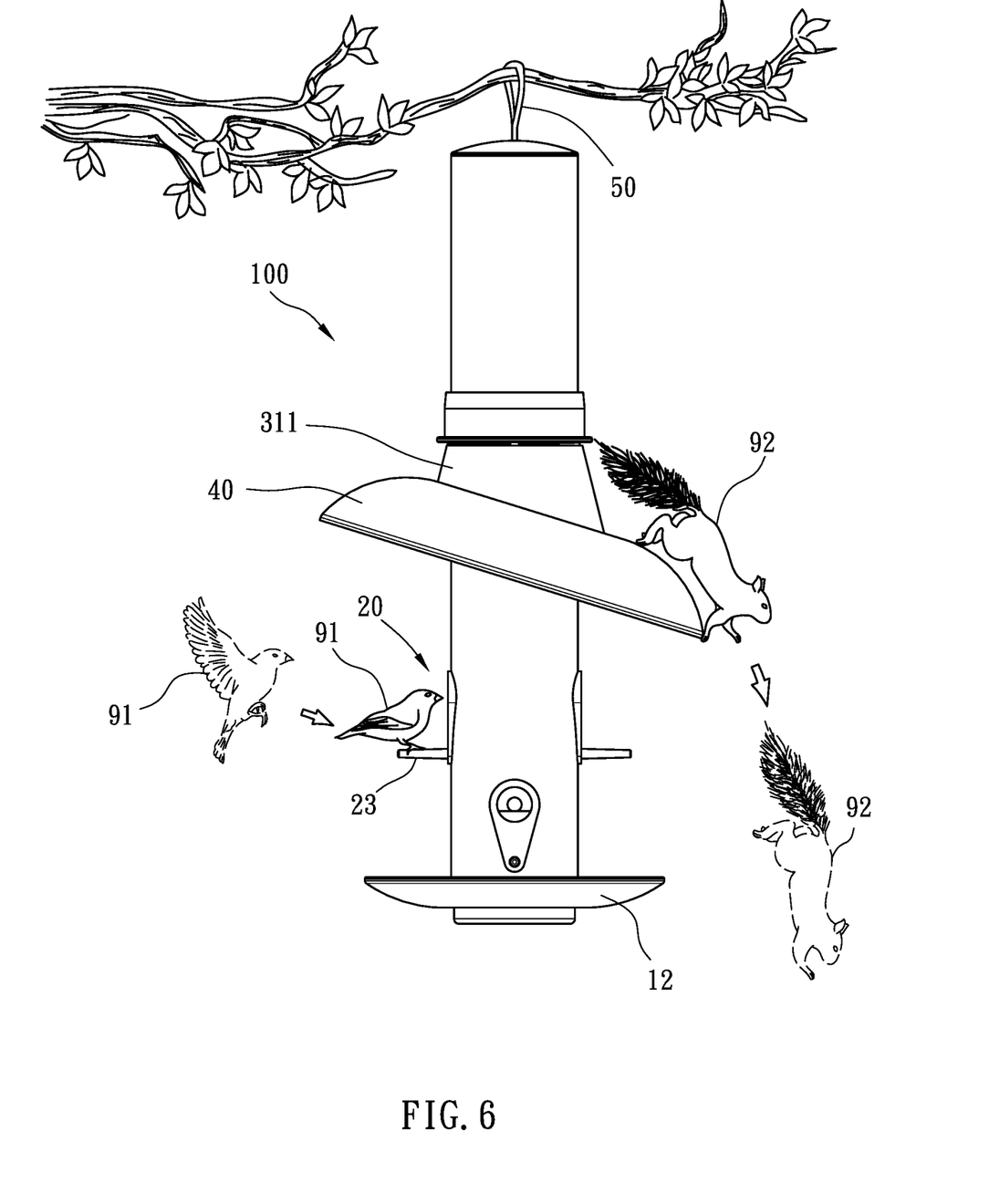
FIG. 6 is a view similar to FIG. 5 showing the bird feed hung from a branch, a squirrel sliding down from a lid, and a bird flying to rest on the perch.

As shown in FIGS. 5 and 6 specifically, the hanging member 50 of the invention is implemented as a loop adapted to hang down from, for example, a tree branch.

As shown in FIG. 5 specifically, a bird 91 may stand on the perch 23 of the feeding station 20 to access the feed in the space 111 through the feeding opening 113.

As shown in FIG. 6 specifically, for accessing the feed in the space 111 a large animal (e.g., a squirrel as shown) 92 may jump from a tree (or a higher place) to descend toward and settle onto the cover 40. However, the squirrel 92 may have difficulties in stably standing on the cover 40 because the cover 40 is shaped as a dome. Further, the bottom edge of the opening 41 is rested upon the rim 313 of the support assembly 30 in an insecure state. Furthermore, the weight of the squirrel 92 may tip the balance of the cover 40. As such, the portion of the cover 40 opposite to the position of the squirrel 92 may move upward similar to lever. As a result, the squirrel 92 slides down from the cover 40 (see FIG. 6). This arrangement can prevent a large animal or the like from stably standing on the cover 40 to access the feed. In FIG. 6, the bird 91 flies to land on the perch 23.

Figure 7:
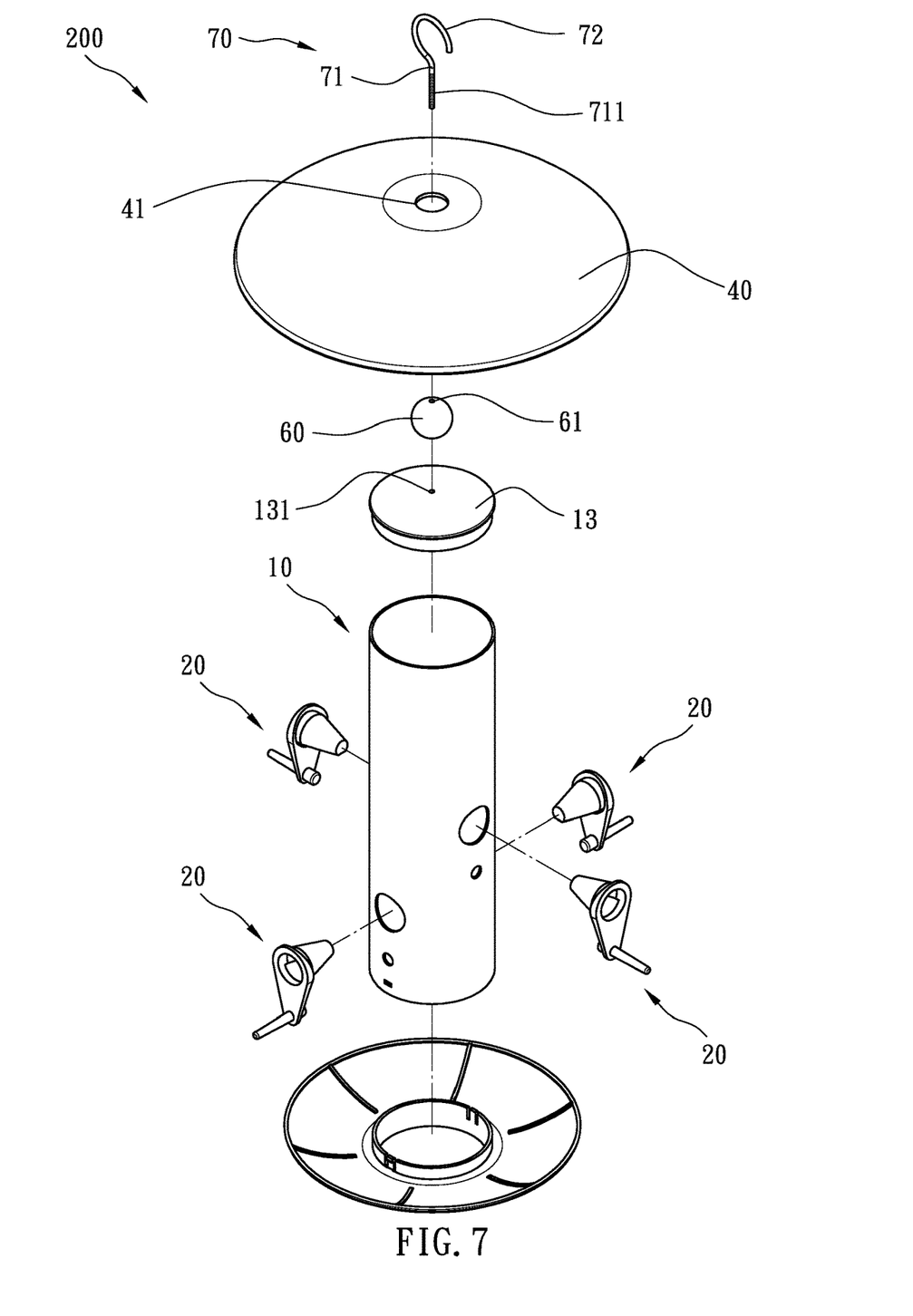
FIG. 7 is an exploded view of a bird feeder according to a second preferred embodiment of the invention.
Figure 8:
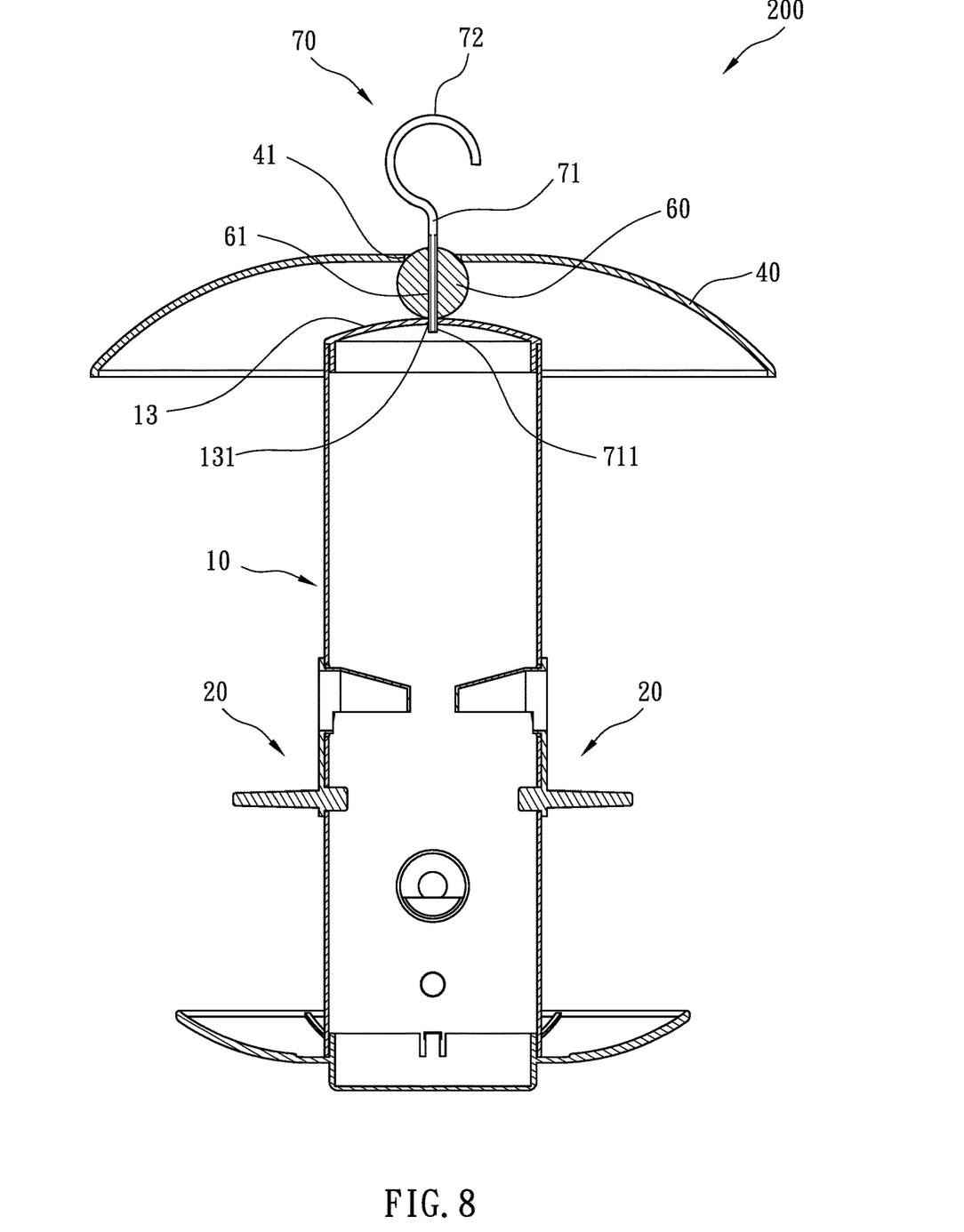
FIG. 8 is a longitudinal sectional view of the bird feeder of FIG. 7.
Figure 9:
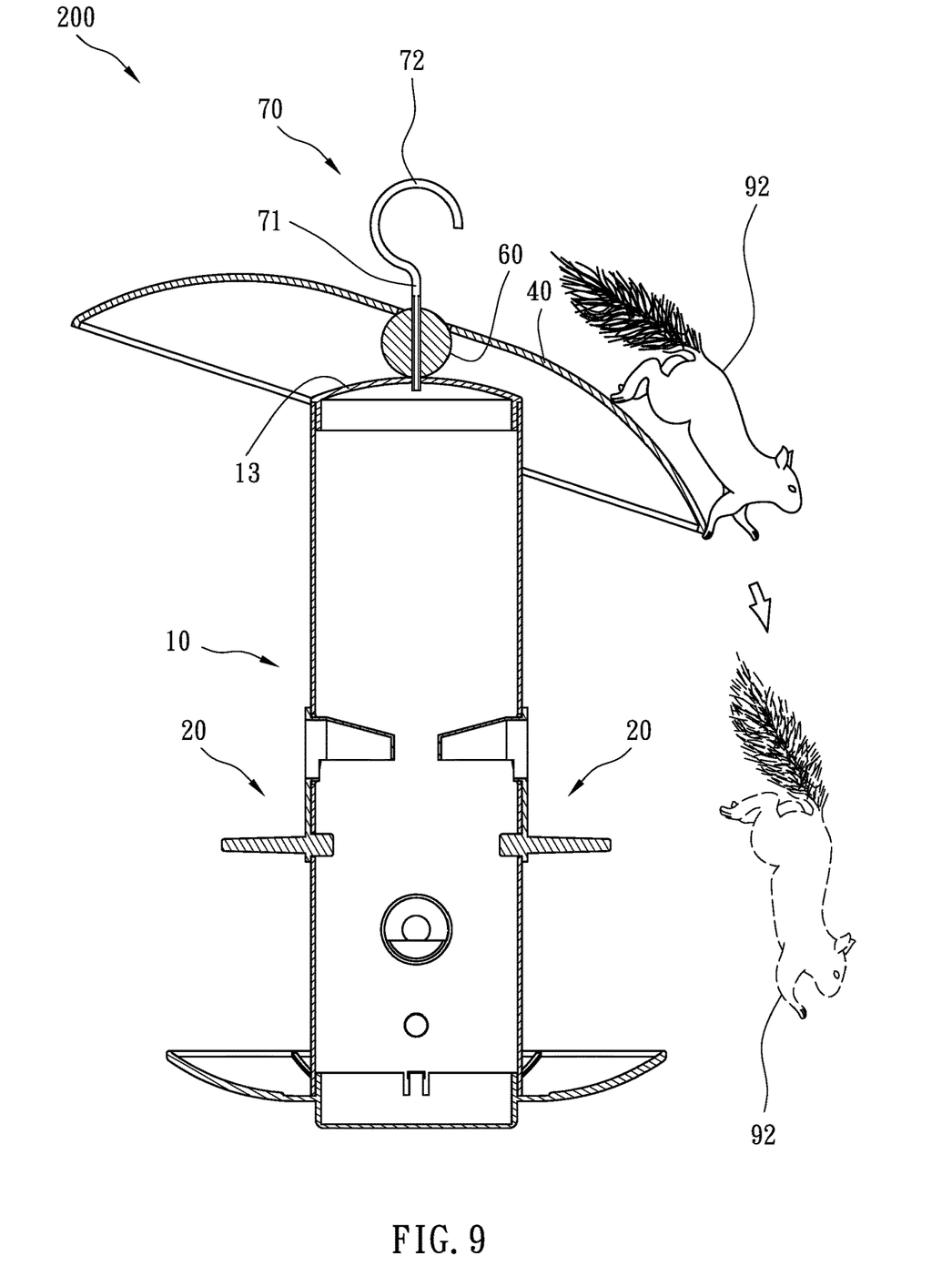
FIG. 9 is a view similar to FIG. 8 showing a squirrel sliding down from a lid.

Referring to FIGS. 7 to 9, a bird feeder 200 in accordance with a second preferred embodiment of the invention is shown. The characteristics of the second preferred embodiment are described below. The bird feeder 200 comprises a feed container 10, a plurality of feeding stations 20, a support 60, a cover 40 and a hanging member 70.

In the embodiment, the feed container 10, the feeding stations 20 and the cover 40 are the same as that described in the first preferred embodiment and thus a detailed description thereof is omitted herein for the sake of brevity. The characteristic differences between the second preferred embodiment and the first preferred embodiment are discussed below.

As shown in FIGS. 7 and 8 specifically, the hole 131 of the cap 13 of the feed container 10 is implemented as a threaded hole 131.

As s shown in FIGS. 7 and 8 specifically, the support 60 is implemented a ball having a hole 61 from one point on the ball to the other opposite point on the ball through a center of the ball.

As shown in FIGS. 7 and 8 specifically, a diameter of the hole 41 of the cover 40 is less than that of the ball-shaped support 60.

As shown in FIGS. 7 and 8 specifically, the hanging member 70 is implemented as a hook having a shank 71 at one end, the shank 71 having external threads 711, and a hooking element 72 at the other end. The shank 71 of the hanging member 70 is adapted to pass through the hole 61 of the support 60 to fasten in the threaded hole 131 of the cap 13. As a result, the support 60 is disposed on a top of the cap 13 and partially exposed on the hole 41 of the cover 40. That is, the hole 41 is rested upon an upper portion of the support 60.

As shown in FIG. 9 specifically, the hole 41 is rested upon the upper portion of the balls-shaped support 60 in an insecure state. For accessing the feed in the feed container 10 a large animal (e.g., a squirrel as shown) 92 may jump from a tree (or a higher place) to descend toward and settle onto the cover 40. However, the squirrel 92 may have difficulties in stably standing on the cover 40 because the cover 40 is shaped as a dome. Further, the hole 41 is rested upon the upper portion of the balls-shaped support 60 in an insecure state. Furthermore, the weight of the squirrel 92 may tip the balance of the cover 40. As such, the portion of the cover 40 opposite to the position of the squirrel 92 may move upward similar to lever. As a result, the squirrel 92 slides down from the cover 40. This arrangement can prevent a large animal or the like from stably standing on the cover 40 to access the feed.

It is noted that the hanging member 70 for hanging on something is shaped a as a hook in the embodiment. Alternatively, the hanging member 70 is shaped as a rope the same as that described in the first embodiment.

While the invention has been described in terms of preferred embodiments, those skilled in the art will recognize that the invention can be practiced with modifications within the spirit and scope of the appended claims.

What is claimed is:

1. A bird feeder comprising:
    a feed container including an internal space and at least one feeding opening on an outer surface and communicating with the internal space;
    at least one perch disposed on the outer surface of the feed container and each extending outwardly under the feeding opening;
    a support assembly disposed on the outer surface of the feed container and above the feeding opening; and
    a cover including a central opening disposed on the feed container;
    wherein a bottom edge of the central opening is rested upon the support assembly so that the cover is configured to incline in response to a force exerted thereon,
    wherein the support assembly comprises a sleeve and an internally threaded nut;
    wherein the sleeve includes a truncated conic member tapered upward, an annular latch extending upward from a top of the truncated conic member, a plurality of vertical grooves formed with the latch, external threads formed on an outer surface of the latch, and an outwardly extending rim provided on a bottom edge of the truncated conic member; and wherein the sleeve is disposed on a cylindrical shroud, and the internally threaded nut is secured to the external threads of the sleeve so that the sleeve and the cylindrical shroud are fastened together.

2. The bird feeder as claimed in claim 1, wherein the feed container comprises the cylindrical shroud, a base, and a cap; and wherein the internal space of the feed container is disposed in the shroud, the shroud has a top opening for allowing feed to fill into the internal space, the feeding opening is provided on a surface of the shroud, the base is releasably secured to a bottom edge of the shroud, and the cap is releasably secured to the top opening of the shroud.

3. The bird feeder as claimed in claim 2, wherein the shroud includes a plurality of holes adjacent to the bottom edge; and wherein the base includes an inverted dome, an upward extending annular flange on a central portion of a top, and a plurality of tabs configured to insert into the holes of the shroud to fasten the shroud and the base together.

4. The bird feeder as claimed in claim 2, wherein the cap includes a hole, further comprising a hanging member attached to the hole of the cap.

5. The bird feeder as claimed in claim 4, wherein the hanging member is a rope having one end tied as a knot fastened in the hole of the cap and the other end tied as a loop.

6. The bird feeder as claimed in claim 4, wherein the hole of the cap is threaded; wherein one end of the hanging member is a hook having an externally threaded shank and the other end thereof is a hooking element; and wherein the shank of the hanging member is configured to pass through the hole of the support assembly to secure to the hole of the cap.

7. The bird feeder as claimed in claim 1, wherein a feeding stations includes a hollow, truncated cone, a joining member having an upper portion provided with the hollow, truncated cone, and a perch provided with a lower portion of the joining member and directly under the feeding opening; and wherein the hollow, truncated cone has a tapered end inserted into the feeding opening with the joining member engaged with the feeding opening.

8. The bird feeder as claimed in claim 7, wherein the feed container further comprises at least one aperture, wherein the feeding station further comprises a pin provided with the joining member and directly under the hollow, truncated cone, and wherein the pin is configured to insert into the aperture.

9. The bird feeder as claimed in claim 1, wherein the cover includes a central opening having a diameter greater than that of a lower portion of the truncated conic member but less than that of the outwardly extending rim.

10. The bird feeder as claimed in claim 1, wherein the cover is dome shaped.

* * * * *